Patented Mar. 26, 1946

2,397,409

UNITED STATES PATENT OFFICE 2,397,409

RUBBER COMPOSITIONS

Arnold R. Davis, Riverside, Conn., assignor to American Cyanamid Company, New York, N. Y., a corporation of Maine No Drawing. Application May 8, 1943, Serial No. 486,204

10 Claims. (Cl. 260—789)

This invention relates to accelerators for the vulcanization of rubber and sulfur-vulcanizable rubber-like materials. More particularly, the invention is concerned with vulcanization accelerators obtained by reacting a diarylguanidine-acidic metal salt adduct with formaldehyde and a substance selected from a group consisting of mercaptobenzothiazole, benzothiazole disulfide and mercaptothiazoline.

The following, in which parts are given by weight, are illustrative of some of the methods of producing these vulcanization accelerators which are more particularly described and claimed in my co-pending application Ser. No. 486,205, filed of even date.

COMPOUND A

A mixture was prepared of the following materials:

| | Parts |
|---|---|
| $(DOTG)_2.ZnCl_2$ | 614 |
| Paraformaldehyde | 180 |
| Mercaptobenzothiazole | 1002 |

This mixture was heated together in a suitable vessel at 70–80° C. for about 30 minutes until a yellow paste was formed. The temperature of the mass was raised to 90–100° C. and heating was continued at that temperature for about 15 minutes at which time the paste began to convert to a clear liquid. After several minutes additional heating at this temperature the entire mass became clear. Upon cooling to room temperature the liquid solidified to a straw-colored resinous solid which had a softening point of about 70° C.

COMPOUND B

A mixture was prepared containing the following materials:

| | Parts |
|---|---|
| $(DOTG)_2.ZnCl_2$ | 614 |
| Paraformaldehyde | 360 |
| Mercaptobenzothiazole | 2004 |

This mixture was heated at about 80° C. until there was some evidence of fusion. The temperature was then raised to about 90° C. whereupon a yellow opaque paste was formed. Upon continuing the heating at about 100° C., the paste was converted to a clear liquid which solidified at room temperature to a clear resinous solid.

COMPOUND C

A mixture was prepared of the following materials:

| | Parts |
|---|---|
| $(DOTG)_2.ZnCl_2$ | 1225 |
| Paraformaldehyde | 60 |
| Mercaptobenzothiazole | 334 |

This mixture was fused together by heating at about 105° C. until a substantially clear liquid was formed, which, on cooling to room temperature, became resinous. This resin softens at about 80° C.

COMPOUND D

A mixture was prepared of the following materials:

| | Parts |
|---|---|
| $(DOTG)_2.ZnCl_2$ | 614 |
| Paraformaldehyde | 180 |
| 2-Mercaptothiazoline | 714 |

Upon heating this mixture in a suitable container, a liquid was formed at about 60° C. Heating continued for about 1 hour at 75° C. and the product on being cooled to room temperature, was a substantially clear balsam.

It should be noted that so far as the final product is concerned there is no apparent distinction between first reacting the thiazole derivative with the aldehyde and then with the diaryl guanidine-acid salt adduct or whether the adduct, thiazole derivative and aldehyde are reacted simultaneously as in the preceding examples. Because it is simpler, the latter procedure illustrated in the foregoing examples is somewhat preferable. The method in which the adduct is reacted with a previously formed aldehyde-thiazole reaction product is illustrated in the following example.

COMPOUND E

Methylol mercaptobenzothiazole was prepared in any suitable manner such as by boiling a mixture of mercaptobenzothiazole with a slight excess over the molecular equivalent of aqueous formaldehyde solution, with or without the addition of alcohol, the methylol mercaptobenzothiazole crystallizing out of the solution on cooling. 591 parts of methylol mercaptobenzothiazole was mixed with 307 parts of $(DOTG)_2.ZnCl_2$ (di-orthotolylguanidine-zinc chloride adduct) in a suitable container and the mixture was gradually heated until it fused. At 80° C. the mass became a clear, viscous straw-colored liquid. This fusion product was solid at room temperature and thin films thereof were clear. This resinous reaction product had a softening point of about 70° C.

COMPOUND F

A mixture was prepared of the following materials:

| | Parts |
|---|---|
| $(DPG)_2.ZnCl_2$ (diphenylguanidine-zinc chloride adduct) | 1674 |
| Paraformaldehyde | 540 |
| Mercaptobenzothiazole | 3006 |

This mixture was heated from room temperature to 75° C. in about 20 minutes and at which time the mass was partially melted. The temperature was gradually raised reaching about 110° C. about 40 minutes from the start of the reaction. At this point the mixture began to froth somewhat, water vapors being evolved. The reaction was continued at 110° C. for an additional 30 minutes. On cooling to room temperature, a clear resin-like material was obtained in a yield of 96.7% based on the starting materials. This product had a softening point of 70° C.

Compound G

A mixture was prepared with the following materials:

(DPG)$_2$ZnCl$_2$ _____ 1674 parts (1 mol)
Paraformaldehyde _____ 540 parts (6 mols)
Benzothiazole disulfide ____ 2988 parts (3 mols)

This mixture was fused together in a suitable vessel by heating to about 125° C. and maintaining that temperature until the liquid product became clear and formed a clear film when flowed out upon a suitable support. On cooling to room temperature, the reaction product solidified to a brownish-colored resin which had a softening point of about 70° C.

Compound H

A solution of 45.5 parts zinc chloride in 17 parts water was mixed with 140.7 parts diphenylguanidine and the mixture was heated in 20 minutes to 105° C. The temperature was maintained at this point for about 18 minutes and in a further period of about 20 minutes there was slowly added a mixture of 60.6 parts of paraformaldehyde (1% excess) and 334.3 parts mercaptobenzothiazole, heating being continued throughout the addition. At about 64 minutes from the start of the initial reaction the temperature had reached 110° C. The temperature was gradually increased until at 100 minutes from the start of the initial reaction, the mass had attained a temperature of 135° C., at which point it was held for an additional 30 minutes. The total time of reaction was about 2 hours 10 minutes.

As in some of the previous examples, the present reaction was attended with some frothing, the frothing and evolution of water vapors ceasing before the end of the 30 minute period of heating at 135° C. On cooling to room temperature, a clear translucent glassy material was formed and this product was still glassy and practically free of crystals after standing for 12 days. This product had a specific gravity of 1.41 and a softening point of 66° C.

The utility of the vulcanization accelerators of the present invention is illustrated by the following rubber, reclaimed rubber and synthetic rubber-like compounds in which parts are given by weight. The compositions are compounded in the usual manner by the use of rubber rolls.

|  | Compounds | |
|---|---|---|
|  | 1 | 2 |
| Butadiene-styrene copolymer | 100 | 100 |
| Carbon black | 50 | 50 |
| Coal tar softener | 5.0 | 5.0 |
| Stearic acid | 1.5 | 1.5 |
| Zinc oxide | 5.0 | 5.0 |
| Sulfur | 3.0 | 3.0 |
| Compound A | 1 | |
| Compound B | | 1 |

| | Compounds (Williams 3 min. "Y" at 100° C., inches) | |
|---|---|---|
| | 1 | 2 |
| Set-up tests—no heat | .145 | .145 |
| After 1.5 hours in H$_2$O at 85° C | .153 | .156 |
| Percent change | +5.5 | +7.6 |

| | Tensile test | | | | | |
|---|---|---|---|---|---|---|
| Cured at 141° C. in min. | Compound 1 | | | Compound 2 | | |
| | Mod.[1] | Ten.[1] | Elong.[2] | Mod.[1] | Ten.[1] | Elong.[2] |
| 15 | 450 | 1,490 | 750 | 400 | 1,390 | 760 |
| 30 | 1,240 | 2,830 | 570 | 1,190 | 2,850 | 575 |
| 60 | 1,945 | 2,995 | 420 | 1,965 | 3,130 | 420 |
| 90 | 2,110 | 3,075 | 400 | 2,200 | 3,130 | 390 |

[1] Modulus (300%) and tensile in lb./sq. in.
[2] Elongation at break in percent.

| | Compounds | | | | |
|---|---|---|---|---|---|
| | 3 | 4 | 5 | 6 | 7 |
| Butadiene-styrene copolymer | 100 | 100 | 100 | 100 | 100 |
| Coal tar softener | 5 | 5 | 5 | 5 | 5 |
| Carbon black | 50 | 50 | 50 | 50 | 50 |
| Stearic acid | 1.5 | 1.5 | 1.5 | 1.5 | 1.5 |
| Zinc oxide | 5.0 | 5.0 | 5.0 | 5.0 | 5.0 |
| Sulfur | 3.0 | 3.0 | 3.0 | 3.0 | 3.0 |
| Compound A | 1.0 | | | | |
| Compound C | | 1.0 | | | |
| Compound E | | | 1.0 | | |
| Compound F | | | | 1.0 | |
| Compound D | | | | | 1.0 |

| | Compounds | | | | |
|---|---|---|---|---|---|
| | 3 | 4 | 5 | 6 | 7 |
| | Williams 3 min. "Y" at 100° C., inches | | | | |
| Set-up tests—no heat | 0.138 | 0.142 | 0.144 | 0.138 | 0.140 |
| After 1.5 hours in H$_2$O at 85° C | .159 | .155 | .156 | .154 | .159 |
| Percent change | +15.2 | +9.9 | +8.3 | +11.6 | +13.6 |
| | Shore hardness (30 sec. dwell) | | | | |
| Cured at 141° C.: | | | | | |
| 15 min | 47 | 44 | 48 | 46 | 45 |
| 30 min | 60 | 54 | 60 | 60 | 55 |
| 60 min | 67 | 61 | 67 | 68 | 62 |
| 90 min | 70 | 64 | 69 | 70 | 66 |

*Tensile tests*

| Cure in min. at 141° C. | Compound 3 | | | Compound 4 | | | Compound 5 | | |
|---|---|---|---|---|---|---|---|---|---|
| | Mod.[1] | Ten.[1] | Elong.[2] | Mod.[1] | Ten.[1] | Elong.[2] | Mod.[1] | Ten.[1] | Elong.[2] |
| 15 | 275 | 995 | 770 | 155 | 355 | 670 | 245 | 905 | 780 |
| 30 | 965 | 2,605 | 610 | 480 | 1,290 | 620 | 1,005 | 2,470 | 580 |
| 60 | 1,840 | 2,865 | 420 | 1,170 | 1,660 | 400 | 1,820 | 2,530 | 390 |
| 90 | 2,060 | 2,830 | 370 | 1,475 | 1,640 | 320 | 2,120 | 2,540 | 350 |

Tensile tests

| Cure in min. at 141° C. | Compound 6 | | | Compound 7 | | |
|---|---|---|---|---|---|---|
| | Mod.[1] | Ten.[1] | Elong.[2] | Mod.[1] | Ten.[1] | Elong.[2] |
| 15 | 245 | 850 | 775 | 200 | 535 | 800 |
| 30 | 975 | 2,640 | 605 | 550 | 1,690 | 675 |
| 60 | 1,770 | 2,395 | 375 | 1,250 | 2,845 | 550 |
| 90 | 2,140 | 2,990 | 390 | 1,640 | 3,040 | 460 |

[1] Modulus (300%) and tensile in lb./sq. in.
[2] Elongation at break in percent.

| | Compounds | |
|---|---|---|
| | 8 | 9 |
| Natural rubber | 50 | 50 |
| Tire reclaim | 85 | 85 |
| Zinc oxide | 3 | 3 |
| Sulfur | 2.5 | 2.5 |
| Snowflake whiting | 22 | 22 |
| Clay | 12 | 12 |
| Medium process oil | 2 | 2 |
| Stearic acid | 1 | 1 |
| Compound A | 1.0 | |
| Compound F | | 1.0 |

| | Compounds (Williams 3 min. "Y" at 100° C. inches) | |
|---|---|---|
| | 8 | 9 |
| Set-up tests—no heat | 0.086 | 0.086 |
| After 1.5 hours, in H₂O at 85° C | .238 | .229 |
| Per cent change | +178 | +166 |

Tensile tests

| Cured at 141° C. in min. | Compounds | | | | | |
|---|---|---|---|---|---|---|
| | 8 | | | 9 | | |
| | Mod.[1] | Ten.[1] | Elong.[2] | Mod.[1] | Ten.[1] | Elong.[2] |
| 20 | 860 | 2,105 | 515 | 790 | 2,080 | 520 |
| 30 | 875 | 2,050 | 495 | 815 | 2,060 | 505 |
| 40 | 820 | 1,995 | 500 | 815 | 2,005 | 500 |

[1] Modulus (300%) and Tensile in lb./sq. in.
[2] Elongation at break in percent.

| | Compounds | |
|---|---|---|
| | 10 | 11 |
| Natural rubber | 50 | 50 |
| Tire reclaim | 85 | 85 |
| Zinc oxide | 3 | 3 |
| Sulfur | 2.5 | 2.5 |
| Snowflake whiting | 22.5 | 22.5 |
| Clay | 12 | 12 |
| Medium process oil | 2 | 2 |
| Stearic acid | 1 | 1 |
| Phenyl betanaphthylamine | 1 | 1 |
| Compound A | 1.0 | |
| Compound G | | 1.0 |

| | Compounds (Williams 3 min. "Y" at 100° C., inches) | |
|---|---|---|
| | 10 | 11 |
| Set up tests—no heat | 0.087 | 0.091 |
| After 1.5 hours in H₂O at 95° C | .229 | .138 |
| Per cent change | +163 | +52 |

Tensile tests

| Cured at 141° C. in min. | Compound 10 | | | Compound 11 | | |
|---|---|---|---|---|---|---|
| | Mod.[1] | Ten.[1] | Elong.[2] | Mod.[1] | Ten.[1] | Elong.[2] |
| 10 | 705 | 2,185 | 585 | 465 | 1,635 | 600 |
| 20 | 820 | 2,255 | 550 | 610 | 1,960 | 585 |
| 30 | 825 | 2,170 | 535 | 685 | 2,045 | 565 |

[1] Modulus (300%) and tensile in lb./sq. in.
[2] Elongation at break in percent.

| | Compounds | | |
|---|---|---|---|
| | 12 | 13 | 14 |
| Butadiene-styrene copolymer | 100 | 100 | 100 |
| Mercaptobenzothiazole | 1.5 | | |
| Compound H | | 1.1 | 1.2 |
| Coal tar softener | 5 | 5 | 5 |
| Easy processing channel black | 50 | 50 | 50 |
| Zinc oxide | 5 | 5 | 5 |
| Sulfur | 2 | 2 | 2 |

| | Compounds (Williams 3 min. "Y" at 100° C., inches) | | |
|---|---|---|---|
| | 12 | 13 | 14 |
| Set-up or scorching tests—no heat | 0.163 | 0.164 | 0.165 |
| After 1 hour boiling H₂O | .192 | .179 | .181 |
| Percent change | +18 | +9 | +10 |
| After 1.5 hours in boiling H₂O | .204 | .189 | .195 |
| Percent change | +25 | +15 | +18 |

| Shore hardness 30 inch dwell | | | |
|---|---|---|---|
| Minutes cured at 141° C.: | | | |
| 30 | 52 | 49 | 50 |
| 60 | 57 | 57 | 58 |
| 90 | 59 | 59 | 59 |

Tensile tests

| 60 minutes at 141° C. | | | |
|---|---|---|---|
| | Mod.[1] | Ten.[1] | Elong.[2] |
| Compound 12 | 575 | 2,885 | 545 |
| Compound 13 | 510 | 2,960 | 585 |
| Compound 14 | 575 | 3,040 | 565 |

| After 48 hours at 100° C. | | | |
|---|---|---|---|
| Compound 12 | 1,770 | 2,200 | 230 |
| Compound 13 | 1,505 | 2,430 | 280 |
| Compound 14 | 1,570 | 2,585 | 285 |

[1] Modulus (200%) and tensile in lb./sq. in.
[2] Elongation at break in percent.

Rate of cut growth was determined on a De Mattia flexing machine with the standard grooved flexing sample. A cut .050 inch long was initially made in the center of the groove half way between the edges of the test piece. The test piece was then put in the machine and bent thru an angle of 135° at the rate of 375 cycles per minute. The length of the cut as it grew across the test piece was measured after the number of cycles given below. The lower figures indicate a lower rate of "cut growth." The average results are given below.

| No. of cycles | 60 minutes cure at 141° C. | | |
|---|---|---|---|
| | Compound 12 | Compound 13 | Compound 14 |
| 5,000 | 0.15″ | 0.15″ | 0.15″ |
| 10,000 | .22 | .20 | .25 |
| 20,000 | .38 | .30 | .38 |
| 30,000 | .53 | .45 | .53 |
| 40,000 | .67 | .55 | .68 |
| 50,000 | .82 | .70 | .83 |

| | After 24 hours at 100° C. | | |
|---|---|---|---|
| 3,000 | .20″ | .25″ | .22″ |
| 5,000 | .35 | .32 | .33 |
| 8,000 | .53 | .48 | .50 |
| 10,000 | .63 | .58 | .58 |
| 13,000 | .80 | .73 | .73 |
| 15,000 | .90 | .83 | .80 |

The above illustrations indicate that the accelerators of the present invention are very effective in the vulcanization of natural rubber compositions, compositions containing large amounts of reclaimed rubber and sulfur-vulcanizable synthetic rubber-like materials. From the described results obtained with compounds 12, 13, and 14, it is clearly evident that these accelerators have many advantages over mercaptobenzothiazole in synthetic rubber of the butadiene-styrene copolymer type. It can be seen that less of my accelerator is required to give the same degree of cure and with less tendency toward scorching. At optimum cure, higher elongations and tensile strengths are obtained with my accelerators, even after aging at 100° C. for 48 hours. Furthermore, after aging the cured compounds at 100° C. for 24 hours, those containing my accelerator showed significantly lower rate of "cut growth."

The rubber or rubber-like compositions produced with the accelerators of the present invention are suitable for use in the production of tires, mechanical rubber goods, heels, soles and the like in accordance with the usual practice.

The rubber accelerators prepared as described above or by equivalent procedures appear to be chemical compounds of complex molecular structure, having softening points which vary from about 60° C. to less than 80° C. These products are chemically different from fusion mixtures of the diarylguanidine-zinc chloride adducts and mercaptobenzothiazole which are opaque yellow-colored solids and which, when examined under the microscope, clearly show the glassy phase of the diarylguanidine-zinc chloride adducts and the crystalline phase of the mercaptobenzothiazole. Furthermore, these latter fusion mixtures have softening points ranging from about 81–108° C., depending on the fusing conditions. These softening points are substantially higher than those of the products of the present invention.

As will be seen from the examples, the conditions for producing the desired complexes may be varied quite considerably without substantially affecting the properties of the products obtained. Starting with the same ingredients, there will be produced in general, the same chemical complex. By suitable methods of preparation, the end products may be made as resins or may be obtained as crystalline compounds. Some of the resinous products have a tendency to form crystals on standing at room temperature for extended periods of time. Crystalline materials may also be obtained by extended heating. Thus the resinous Compound F may be heated to about 80–85° C. at which temperature it is maintained for about 30 minutes and this product, on cooling to room temperature, is generally resinous in appearance but on examination under a microscope, shows crystal formation. Portions of this resinous reaction product may be dissolved in aceton or benzol and from these solutions crystals may be obtained which possess optical properties different from those of the starting materials, thereby indicating chemical reaction.

The diarylguanidine zinc chloride adducts which are used for the preparation of my new accelerators, may be made in any suitable manner as set forth in the examples or in accordance with the disclosures of my patents, Nos. 2,259,063, 2,259,064, and 2,259,414, all issued October 14, 1941. In place of the zinc chloride referred to, other metal chlorides or sulfates may be used as described in my patents referred to above. The acidic salts of organic acids may also be used, i. e., acetates, oxalates, maleates and the like. These metal salts include zinc sulfate, zinc oxalate, zinc acetate, zinc maleate, aluminum sulfate, hydrated aluminum chloride, cadmium chloride, cadmium sulfate, stannous chloride, stannic chloride, stannous sulfate and stannic sulfate. Other suitable diarylguanidines may be used, e. g., phenylorthotolylguanidine.

Other changes and variations may be made in carrying out the present invention without departing from the spirit and scope thereof as defined in the appended claims.

I claim:

1. The process which comprises vulcanizing rubber and sulfur-vulcanizable rubber-like materials in the presence of sulfur and a vulcanization accelerator comprising the stable chemical complex softening at from about 65–80° C. obtained by fusing one mol part of a diarylguanidine-zinc chloride adduct with one to twelve mol parts of paraformaldehyde and from one to 12 mol parts of a substance selected from the group consisting of mercaptobenzothiazole, benzothiazole disulfide and mercaptothiazoline.

2. The process which comprises vulcanizing rubber and sulfur-vulcanizable rubber-like materials in the presence of sulfur and a vulcanization accelerator comprising the stable chemical complex softening at from about 65–80° C. obtained by fusing one mol part of an adduct of diarylguanidine and an acidic salt of a metal of the group consisting of zinc, aluminum, cadmium and tin, with about one to twelve mol parts of paraformaldehyde and about one to twelve mol parts of a substance selected from the group consisting of mercaptobenzothiazole, benzothiazole disulfide and mercaptothiazoline.

3. The process which comprises vulcanizing rubber and sulfur-vulcanizable rubber-like materials in the presence of sulfur and a vulcanization accelerator comprising the chemical complex obtained by fusing from one to twelve mol parts of methylol mercaptobenzothiazole with about one mol part of diarylguanidine-zinc chloride adduct.

4. A vulcanizable composition comprising sulfur, and unvulcanized material selected from the group consisting of rubber and sulfur-vulcanizable rubber-like materials, and a vulcanization accelerator comprising the stable chemical complex softening at from about 65–80° C. obtained by fusing one mol part of a diarylguanidine-zinc chloride adduct with about one to twelve mol parts of paraformaldehyde and about one to twelve mol parts of a substance selected from the group consisting of mercaptobenzothiazole, benzothiazole disulfide and mercaptothiazoline.

5. A vulcanizable composition comprising sulfur, an unvulcanized material selected from the group consisting of rubber and sulfur-vulcanizable rubber-like materials, and a vulcanization accelerator comprising the stable chemical complex softening at from about 65–80° C. obtained by fusing one mol part of an adduct of diarylguanidine and an acidic salt of a metal of the group consisting of zinc, aluminum, cadmium and tin, with about one to twelve mol parts of paraformaldehyde and about one to twelve mol parts of a substance selected from the group consisting of mercaptobenzothiazole, benzothiazole disulfide and mercaptothiazoline.

6. A vulcanizable composition comprising sulfur, an unvulcanized material selected from the group consisting of rubber and sulfur-vulcanizable rubber-like materials, and a vulcanization accelerator comprising the stable chemical complex softening at from about 65–80° C. obtained by fusing from one to twelve mol parts of methylol mercapto-benzothiazole with about one mol part of a diarylguanidine-zinc chloride adduct.

7. A composition comprising a material selected from the group consisting of rubber and sulfur-vulcanizable rubber-like materials, vulcanized in the presence of sulfur and a vulcanization accelerator comprising the stable chemical complex softening at from about 65–80° C. obtained by fusing one mol part of a diarylguanidine-zinc chloride adduct with about one to twelve mol parts of para formaldehyde and about one to twelve mol parts of a substance selected from the group consisting of mercaptobenzothiazole, benzothiazole disulfide and mercaptothiazoline.

8. A composition comprising a material selected from the group consisting of rubber and sulfur-vulcanizable rubber-like materials, vulcanized in the presence of sulfur and a vulcanization accelerator comprising the stable chemical complex softening at from about 65–80° C. obtained by fusing one mol part of an adduct of diarylguanidine and an acidic salt of a metal of the group consisting of zinc, aluminum, cadmium and tin, with about one to twelve mol parts of paraformaldehyde and about one to twelve mol parts of a substance selected from the group consisting of mercaptobenzothiazole, benzothiazole disulfide and mercaptothiazoline.

9. A composition comprising a material selected from the group consisting of rubber and sulfur-vulcanizable rubber-like materials, vulcanized in the presence of sulfur and a vulcanization accelerator comprising the stable chemical complex softening at from about 65–80° C. obtained by fusing from one to twelve mol parts of methylol mercaptobenzothiazole with about one mol part of a diarylguanidine-zinc chloride adduct.

10. The composition of claim 4 in which the accelerator is prepared by fusing 1 mol of the adduct with 6 mols paraformaldehyde and 6 mols mercaptobenzothiazole.

ARNOLD R. DAVIS.

Certificate of Correction

Patent No. 2,397,409.     March 26, 1946.

ARNOLD R. DAVIS

It is hereby certified that error appears in the printed specification of the above numbered patent requiring correction as follows: Page 3, second column, line 71, in the table, second column thereof, under the heading "Compound 12" for ".20'''" read *.25''*; and that the said Letters Patent should be read with this correction therein that the same may conform to the record of the case in the Patent Office.

Signed and sealed this 16th day of September, A. D. 1947.

[SEAL]

THOMAS F. MURPHY,
*Assistant Commissioner of Patents.*